Patented Dec. 6, 1938

2,138,835

UNITED STATES PATENT OFFICE 2,138,835

LUBRICANT

John G. Butz, Philadelphia, Pa., assignor to The Atlantic Refining Company, Philadelphia, Pa., a corporation of Pennsylvania No Drawing. Application June 1, 1936, Serial No. 82,932

12 Claims. (Cl. 87—9)

The present invention relates to the art of lubrication, and more particularly to the lubrication of surfaces engaging under extreme pressure, as for example, the rubbing surfaces of hypoid gears, free wheeling transmissions, speed reducers and the like.

The general tendency in the design of modern machinery has been toward a higher ratio between power and "dead weight". This is especially true in the automotive industry, and in recent years certain types of gears and other mechanisms have been developed with the operating pressures on the working surfaces so high that ordinary mineral oil lubricants will not provide sufficient lubrication for satisfactory operation.

Heretofore it has been thought that lubrication consists in maintaining a film of oil between the rubbing surfaces, thereby preventing them from coming into contact with one another and thus preventing wear. That this condition exists in well lubricated bearings is well known, but this conception of lubrication does not apply to highly loaded gears. In well lubricated bearings the loads rarely exceed 2000 lbs. per sq. in. projected area and the rubbing speeds are generally high enough to maintain a film of oil which separates the rubbing surfaces. In automobile gears, the pressures between gear teeth reach very high values and even the most viscous oils or greases cannot be retained between the surfaces of the teeth in a sufficiently thick film to prevent metal to metal contact, particularly when operating temperatures of 210° F. or higher are commonly encountered.

It has been known that compounded lubricants such as, for example, mineral oils containing fatty oils, fatty acids, metallic soaps, sulfur or combined chlorine, posess lubricating qualities which render them suitable for use under high operating pressures. These compounded oils function satisfactorily under conditions which would cause failure of an unblended mineral oil, if used alone. It is believed that the successful use of such compounded oils depends upon the adsorption and reaction or union of certain components of these oils with the metal surfaces whereby a film of metallic compound, such as, for example, iron sulfide or chloride is formed. It appears that such a film or plating has a low coefficient of friction and that satisfactory operation of heavily loaded bearings or gears depends upon the formation and maintenance of such a film, and not upon the retaining of a film of oil between the bearing surfaces. The hydrocarbon oil constituent of an extreme pressure lubricant serves primarily to remove frictional heat, to wash away any solid particles which may result from wear, and to prevent oxidation of the engaging surfaces.

I have discovered that organic compounds of phosphorus, and more particularly the phosphine oxides and phosphine sulfides, when admixed with hydrocarbon oils, are of special utility in the field of extreme pressure lubrication. Among the compounds which may be employed in accordance with my invention are the aliphatic, aromatic, hydroaromatic and heterocyclic phosphine oxides and/or sulfides, as well as the phosphine oxides and/or sulfides containing mixed functions, for example, the alk-aryl phosphine oxides and/or sulfides. Furthermore, the phosphine oxides and/or sulfides may contain halogen, for example, chlorine, bromine or fluorine. The formulae for these compounds may be generally represented as:

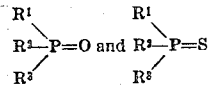

wherein $R^1$, $R^2$, and $R^3$ may be aliphatic, aromatic, hydroaromatic or heterocyclic functions. $R^1$ and $R^2$ may be substituent functions while $R^3$ may be hydrogen, or $R^1$ may be a substituent function while $R^2$ and $R^3$ are hydrogen.

The aliphatic phosphine oxides and/or sulfides may be exemplified by trimethyl phosphine oxide and/or sulfide and their homologues, tri-ethyl, tri-propyl, tri-butyl, and the like. The aromatic phosphine oxides and/or sulfides may be represented, for example, by tri-phenyl phosphine oxide and/or sulfide and their homologues, tritolyl, tri-xylyl, as well as the phosphine oxides and/or sulfides containing the naphthyl and anthracyl functions and their homologues. Along with the hydroaromatic phosphine oxides and/or sulfides may be included tri-cyclohexyl phosphine oxide and/or sulfide, tri-tetrahydronaphthyl phosphine oxide and/or sulfide, and the like. The phosphine oxides and/or sulfides which contain mixed functions may be illustrated by dibutyl monophenyl phosphine oxide and/or sulfide, mono-ethyl ditolyl phosphine oxide and/or sulfide, and the like. The heterocyclic phosphine oxides and/or sulfides are exemplified by tri-furyl phosphine oxide and/or sulfide, tri-pyridyl, and tri-thienyl phosphine oxides and/or sulfides. The halogenated phosphine oxides and/or sulfides include the chlorine, bromine and fluorine derivatives of all of the above mentioned compounds and may be represented specifically, for example, by chloro-tri-butyl phosphine oxide and/or sulfide, chloro-tri-tolyl phosphine oxide and/or sulfide, and bromo-di-butyl mono-tolyl phosphine oxide and/or sulfide. The phosphine oxides and/or sulfides are not necessarily limited to the tri-substituted derivatives, since compounds such as phosphenyl oxide $C_6H_5PH_2O$ and phosphino-benzene $C_6H_5PO_2$ may be suitably employed.

In preparing my lubricant, I add to a suitable mineral oil one or a mixture of two or more of the phosphine oxides and/or sulfides in quantity sufficient to improve the lubricating value of the oil to any desired extent, depending upon the operating conditions under which the lubricant is to be used. I have found that the quantity of oxide or sulfide required, in general, does not exceed substantially 5% by weight of my composition. Quantities of the oxides or sulfides as small as 3%, or even 1% or less, have been found to improve lubricating oils to a satisfactory extent. In certain instances, 0.1% to 0.2% by weight of the phosphine oxides was sufficient to improve the lubricating oil to the desired extent. In preparing my lubricant, I may obtain a homogeneous solution or stable suspension of the phosphide oxide or sulfide in mineral oil by agitating the mixture at normal or elevated temperatures, or I may dissolve the oxide or sulfide in a suitable solvent and add the resulting solution to the oil, thereafter removing the solvent by vaporization.

The mechanism by which the phosphine oxides and/or sulfides in lubricating oils function to improve the load-bearing ability and other properties thereof is not entirely understood. It appears, however, that the functioning is dependent upon the adsorption of the compounds upon the metal surfaces of the bearings or other lubricated parts, and the reaction or chemical combination of such compounds with the metal under the influence of localized high temperature and pressure to form a coating or plating having a low coefficient of friction which is resistant to seizure under high operating pressures.

The following tables indicate the results obtained when testing my improved lubricating oils in an Almen extreme pressure lubricant testing machine at 200 R. P. M., in comparison with the unblended hydrocarbon oil employed as a base oil. The pressures indicated are the pressures in lbs./sq. in. projected bearing area sustained before seizure of the test bearing occurs.

Table 1

| Lubricant tested | Pressure lbs./sq. in. projected bearing area |
|---|---|
| Base oil | 4,000 |
| Base oil +0.1% tributyl phosphine oxide | 8,000 |
| Base oil +0.15% tributyl phosphine oxide | 17,000 |
| Base oil +0.25% tributyl phosphine oxide | 21,000 |
| Base oil +0.50% tributyl phosphine oxide | 22,000+ |
| Base oil +1.00% tributyl phosphine oxide | 22,000+ |
| Base oil +2.00% tributyl phosphine oxide | 22,000+ |

Table 2

| Lubricant tested | Pressure lbs./sq. in. projected bearing area |
|---|---|
| Base oil | 4,000 |
| Base oil +0.1% triphenyl phosphine oxide | 10,000 |
| Base oil +0.2% triphenyl phosphine oxide | 18,000 |

Table 3

| Lubricant tested | Pressure lbs./sq. in. projected bearing area |
|---|---|
| Base oil | 4,000 |
| Base oil +0.25% tri-tolyl phosphine oxide | 11,000 |
| Base oil +0.50% tri-tolyl phosphine oxide | 16,000 |

It will be seen, from the above examples, that the addition of phosphine oxides to a hydrocarbon oil improves the lubricating value of such an oil to a marked degree, and imparts to the oil certain properties which render it suitable for use in the lubrication of surfaces engaging under extreme pressure. Under certain conditions, for example in the lubrication of transmissions or gear drives where elevated temperatures are not normally encountered, it has been found that the halogenated, and particularly the chlorinated phosphine oxides are more efficient than the unchlorinated oxides in their ability to improve the load-bearing capacity of the lubricants.

Furthermore, I have found that phosphine oxides and/or sulfides having as substituents long hydrocarbon chains or substituted hydrocarbon chains, are capable of not only improving the load-bearing capacity of hydrocarbon oils but also effect a lowering of the coefficient of friction, or improve the "oiliness" of the lubricant. The phosphine oxides and/or sulfides containing long chain alkyl radicals such as cetyl, lauryl, dodecyl and oleyl, and the substitution products thereof, are representative examples of this type of materials.

While I have described my invention with reference to the lubrication of gears and bearings operating under heavy loads, I do not intend to limit myself thereto, but contemplate the use of my lubricant in operations such as the cutting and boring of metals, in which conditions of extreme pressure and temperature are normally encountered, and also in the lubrication of mechanisms operating under moderate pressures, as for example, the crankcase bearings and cylinder walls of internal combustion engines. Furthermore, my compounded oil may be utilized as a base in the preparation of thickened oils, i. e., greases, by the addition thereto of soaps or other conventional thickening agents, in order to obtain lubricants of desired viscosity. My compounded oil may also be blended with fatty oils, fatty acids, synthetic esters and the like, or the phosphine oxides and/or sulfides, per se, may be admixed with fatty oils, for the lubrication of mechanisms in which the presence of a fatty oil is desirable.

What I claim is:

1. A lubricant comprising a hydrocarbon oil and a phosphine oxide.

2. A lubricant comprising a hydrocarbon oil and less than substantially 5% of a phosphine oxide.

3. A lubricant comprising a hydrocarbon oil and less than substantially 1% of a phosphine oxide.

4. A lubricant comprising a hydrocarbon oil and from about 0.1% to about 0.5% of a phosphine oxide.

5. A lubricant comprising a hydrocarbon oil and a small quantity of an alkyl phosphine oxide.

6. A lubricant comprising a hydrocarbon oil and a small quantity of tri-butyl phosphine oxide.

7. A lubricant comprising a hydrocarbon oil and a small quantity of tri-phenyl phosphine oxide.

8. A lubricant comprising a hydrocarbon oil and a phosphine oxide having the formula

wherein $R^1$, $R^2$, and $R^3$ are of the group consisting of aliphatic, aromatic, hydroaromatic and heterocyclic radicals.

9. A lubricant comprising a hydrocarbon oil and a small quantity of a halogenated phosphine oxide.

10. A lubricant comprising a hydrocarbon oil and a small quantity of a compound from the group consisting of phosphine oxides and phosphine sulfides.

11. A lubricant comprising a hydrocarbon oil and a small quantity of a compound from the group consisting of the phosphine oxides, phosphine sulfides and the halogen substitution products thereof.

12. The method of reducing friction between relatively moving metallic surfaces which comprises maintaining therebetween a film of lubricating oil and at the same time chemically acting upon such surfaces by means of a phosphine oxide, said phosphine oxide being present in said film in relatively small amounts.

JOHN G. BUTZ.